United States Patent [19]
Hagersten et al.

[11] Patent Number: 5,864,671
[45] Date of Patent: Jan. 26, 1999

[54] HYBRID MEMORY ACCESS PROTOCOL FOR SERVICING MEMORY ACCESS REQUEST BY ASCERTAINING WHETHER THE MEMORY BLOCK IS CURRENTLY CACHED IN DETERMINING WHICH PROTOCOLS TO BE USED

[75] Inventors: Erik E. Hagersten, Palo Alto; Mark Donald Hill, Los Alto, both of Calif.

[73] Assignee: Sun Microsystems, Inc., Mountain View, Calif.

[21] Appl. No.: 673,957

[22] Filed: Jul. 1, 1996

[51] Int. Cl.$^6$ ..................................................... G06F 12/00
[52] U.S. Cl. ................................ 395/200.43; 395/200.44; 395/200.6
[58] Field of Search ...................... 707/10, 200; 364/134; 711/121, 113; 395/200.43, 200.44, 200.6

[56] References Cited

U.S. PATENT DOCUMENTS

| | | | |
|---|---|---|---|
| 5,055,999 | 10/1991 | Frank et al. | 364/200 |
| 5,119,481 | 6/1992 | Frank et al. | 395/325 |
| 5,151,989 | 9/1992 | Johnson et al. | 707/10 |
| 5,251,308 | 10/1993 | Frank et al. | 395/425 |
| 5,297,265 | 3/1994 | Frank et al. | 395/400 |
| 5,491,817 | 2/1996 | Gopal et al. | 707/200 |
| 5,535,116 | 7/1996 | Gupta et al. | 364/134 |
| 5,537,569 | 7/1996 | Masubuchi | 711/121 |
| 5,584,007 | 12/1996 | Ballard | 711/113 |

FOREIGN PATENT DOCUMENTS 0 392 657 A1  10/1990   European Pat. Off. .

OTHER PUBLICATIONS

Archibald, et al., "An Economical Solution to the Cache Coherence Problem", Department of computer Science, FR–35, University of Washington, Seattle, WA.

Grahn, et al., "Efficient Strategies for Software–Only Directory Procotols in Shared–Memory Multiprocessors", Department of Computer Engineering, Lund University, 8345 Computer Architecture News, 23 (1995) May, No. 2, New York, US.

Kumar, et al. "Efficient and Scalable Cache Coherence Schemes for Shared Memory Hypercube Mulitprocessors", Department of Computer Science, Texas A&M University, College Station, TX, © 1994 IEEE.

Farkas, et al., "Scalable Cache consistency for Hierachically Structured Multiprocessors", The Journal of Supercomputing, 8.345–369 (1995) © 1995 Kluwer Academic Publishers, Boston. Manufactured in the Netherlands.

(List continued on next page.)

*Primary Examiner*—Thomas C. Lee
*Assistant Examiner*—David Ton
*Attorney, Agent, or Firm*—Beyer & Weaver, LLP

[57] ABSTRACT

A method, in a computer network having a first plurality of nodes coupled to a common network infrastructure and a distributed shared memory distributed among the first plurality of nodes, for servicing a memory access request by a first node of the first plurality of nodes. The memory access request pertains to a memory block of a memory module that has a home node different from the first node in the computer network. The home node has a partial directory cache that has fewer directory cache entries than a total number of memory blocks in the memory module. The method includes the step of ascertaining whether the memory block is currently cached in the partial directory cache. If the memory block is currently cached in the partial directory cache, the first memory access request is serviced using a directory protocol. If the memory block is not currently cached in the partial directory cache, the first memory access request is serviced using a directory-less protocol. The directory states pertaining to copies of the memory block in the network nodes is cached in the partial directory cache when the memory access request generates a renewal point with respect to the directory states.

23 Claims, 8 Drawing Sheets

OTHER PUBLICATIONS

Lovett, et al., "STiNG: A CC–NUMA Computer System for the Commercial Marketplace," Sequent Computer Systems, Inc., Beaverton, OR, ISCA '96 May 1996 PA, USA © 1996 ACM 0–89791–786–3/96/0005, pp. 308–317.

O'Krafka, et al., "An Empirical Evaluation of Two Memory–Efficient Directory Methods", Department of Electrical Engineering and Computer Sciences, University of California, Berkeley, The 17 th Annual International Symposium on Computer Architecture, Seattle, WA, May 28–31, 1990, IEEE Computer Society Press, Los Alamitos, Ca, pp. 138–147.

Lenoski, et al., "The Stanford Dash Multiprocessor," The Computer Systems Laboratory at Stanford University, 8153 Computer, 25 (1992) Mar., No. 3, Los Alamitos, CA, US, © 1992 IEEE, pp. 63–79.

| ROW | NODE 100 | NODE 102 | NODE 104 | NODE 106 |
|---|---|---|---|---|
| A | M | I | I | I |
| B | I | I | M | I |
| C | S | S | I | S |
| D | I | M | I | I |
| E | S | S | S | I |
| F | S | S | I | I |
| G | S | S | S | I |
| H | I | I | I | M |

HYBRID MEMORY ACCESS PROTOCOL FOR SERVICING MEMORY ACCESS REQUEST BY ASCERTAINING WHETHER THE MEMORY BLOCK IS CURRENTLY CACHED IN DETERMINING WHICH PROTOCOLS TO BE USED

BACKGROUND OF THE INVENTION

The present invention relates generally to methods and apparatus for facilitating efficient communication in a computer network. More specifically, the present invention relates to improved techniques that permit nodes of a computer network to access the network's distributed shared memory in an efficient manner.

Computer networks having distributed shared memory (DSM) are known in the art. For discussion purposes, FIG. 1 illustrates a computer network 10 having a network infrastructure 12 (NI). Four network nodes 100, 102, 104, and 106 are shown coupled to network infrastructure 12. Through network infrastructure 12, nodes 100–106 may communicate among one another to share programs, data, and the like. Of course, the number of nodes provided per network 10 may vary depending on needs, and may include any arbitrary number of nodes.

Within each network node, there exists a memory space, typically implemented in a memory module, whose memory blocks may be accessed by other network nodes. In general, each memory block in the network has an unique address that allows it to be uniquely addressed. The union of all memory blocks in the nodes of network 10 comprises the distributed shared memory (DSM). It should be noted, however, that although the memory blocks of the DSM may be accessed by any network node, a given memory block is typically associated with some home node in network 10.

For the purposes the present invention, network infrastructure 12 may have any configuration and may be implemented by any protocol. Generally, network infrastructure 12 possesses the ability to correctly deliver a message from one node to another according to the destination address associated with that message. One exemplar network infrastructure is Sequent Numa-Q, available from Sequent Computer Systems, Inc. of Beaverton, Oreg.

Each of network nodes 100–106 may be as simple as a computer having a single processor that is coupled to its own memory via a memory cache. A network node may also be as complicated as a complete bus-based multi-processor system or even a multi-processor sub-network. In the latter case, a node may include multiple processors, each of which is coupled to its own memory module and memory cache, as well as to the distributed shared memory distributed among other nodes in the network. For ease of illustration, the invention will be described herein with reference to nodes having a single processor. It should be apparent to those skilled in the art given this disclosure, that the principles and techniques disclosed herein are readily extendible to nodes having multiple processors.

In the prior art, the network nodes typically communicate among themselves using a bus-based approach or a directory protocol. By way of example, FIG. 2 is a schematic of a computer network, including exemplar nodes 100a and 100b, for implementing one version of the prior art bus-based protocol. In node 100a of FIG. 2, processor 200a is coupled to a memory module 204a, e.g., a dynamic random access memory module, via a memory cache 202a, which is typically implemented using some type of fast memory, e.g., static random access memory (SRAM). Memory module 204a may be divided into memory blocks, and memory cache 202a serves to expedite access to the memory blocks of memory module 204a by holding a copy of the requested memory block, either from its own node or another node in the network (such as node 100b), in its fast memory circuits. Through a network interface (included in each node but not shown to simplify illustration), node 100a may communicate with node 100b as well as other nodes in the network via a bus-based network infrastructure, e.g., bus 206, to gain access to the distributed shared memory (DSM), which is distributed in the nodes of the network.

In a bus-based computer network, a memory request by a given node is typically broadcasted on the common bus to other nodes so that the request may be seen by all other nodes in the network. For example, if processor 200a of FIG. 2 needs to access a memory block residing in another memory module of another network node, it typically broadcasts on the common bus its memory access request. All the nodes on a network would receive the same request, and the node whose memory address ranges match the memory address provided in the memory access request then responds.

This broadcast technique works adequately for relatively small computer networks. As computer networks grow larger and/or become more physically dispersed, the bus-based approach has several difficulties. For example, as the bus grows larger to accommodate more nodes, it is desirable to operate the bus at a higher speed since each node generally needs to access the bus for a period of time to execute its transactions. Operating a large bus at a high frequency is difficult because as busses become larger, they become electrically longer and electrical concerns, e.g., capacitance, may substantially limit their operating frequency. Consequently, the bus-based approach is generally unsuitable for large or physically dispersed computer networks.

Further, a bus-based protocol requires the provision of an arbiter circuit to enforce a natural ordering of transactions by the various nodes of the computer network. The arbiter needs to ensure that bus access requests from the various network nodes are properly ordered to avoid race conditions. The use of arbiter circuits and an arbitration scheme represent an additional layer of complexity, thereby adding to the expenses in the creation and maintenance of computer networks.

As can be appreciated by those skilled in the art, the extra messages that need to be sent in a bus-based system from the requesting node to all the nodes in a network represent an extra burden on the bus. Further, the requesting node must poll every node in the network and require each node to analyze the request to either ignore the request, or to respond. The extra work required of the other nodes in the network represents extra delay and additional processing that the network nodes must perform.

The directory protocol represents an attempt to implement a computer network in which natural broadcast is not necessary to service memory access requests, i.e., a transaction or a request from a node does not need to be broadcasted to all other nodes in the network. FIG. 3 illustrates, for discussion purposes, a computer network node 100 suitable for implementing the directory protocol. In every node of the computer network employing the directory protocol, there may be provided a directory containing directory entries for the memory blocks of its memory module. With reference to FIG. 3, there is shown a directory 210 which may be implemented as a data structure in memory and contains directory entries, each of which correspond to a unique memory block of the memory module in node 100. For example, there is shown in directory 210 a directory entry 212, which corresponds to a memory block 208 in a memory module 204. The union of all directory entries in a given node represents the directory for that node. There is also shown in FIG. 3 an interface 206, representing the circuit for connecting a node to its outside world, e.g., to the network infrastructure.

In the directory protocol, each node in the network, e.g., each of nodes 100–106, must know whether it has an exclusive copy of a block of memory (a modifiable or M-copy), a shared, read-only copy (a S-copy), or it does not have a copy (an invalid or I-copy). When a node has an M-copy of the block, it is said to have an exclusive copy and can modify this copy to cause it to be potentially different from its counterpart in memory module 204 of the block's home node. When any node in the computer network possesses an M-copy of memory block 208, all other nodes give up their copies, i.e., possessing only I-copies of that memory block.

Whereas only one node may have an M-copy of a memory block, multiple nodes may concurrently possess shared copies (S-copies). A node having an S-copy essentially has a read-only copy, i.e., it cannot modify the memory block's contents. S-copies of a memory block may exist contemporaneous with I-copies of the same memory block in a network. S-copies of a memory block cannot, however, co-exist with any M-copy of the same memory block.

In one implementation, a node may request to cache an exclusive copy (M-copy) by issuing an RTO request, where RTO represents "read-to-own." A node may request to cache a shared copy of a memory block by issuing an RTS request, where RTS represents "read-to-share." A node may also request to write back the exclusive M-copy of a memory block it currently possesses by issuing a WB request, where WB stands for write-back.

As stated, every node in the computer network knows which kind of copy of memory block 208 it currently possesses. Thus, this knowledge regarding memory block 208 is distributed among the nodes of the network. Further, the same knowledge regarding memory block 208 is also centralized at the home node of memory block 208, i.e., in directory entry 212 of directory 210.

To simplify illustration, the discussion herein will be made with reference to the four-node network of FIG. 1 although, as noted earlier, the network may contain any arbitrary number of nodes. The operation of the prior art directory protocol may be best illustrated with reference to the examples of FIG. 4 and the state diagram of FIG. 5. In FIG. 4, there are shown in rows A–H the states for memory block 208 of node 100 of FIG. 3. At any given point in time, one of rows A–H represents the contents of directory entry 212 in directory 210 at home node 100. It should be borne in mind that although a single memory block 208 is discussed in detail herein to simplify the illustration, caching is typically performed on a plurality of memory blocks.

In row A, node 100 is shown to have an exclusive M-copy of memory block 208 (M state in row A, column 100). By definition, all other network nodes must have invalid copies of memory block 208 (shown by states I in row A, columns 102–106). Incidentally, the M-copy of memory block 208 may currently be cached by the memory cache in its home node, e.g., node 100, or in the memory module of the home node.

Transaction #1 (Row A to row B of FIG. 4):

Suppose node 104 now desires an exclusive M-copy of memory block 208, which, as shown in state A, currently resides at its home node 100. With reference to FIG. 4, node 104 represents the requesting node 502, while node 100 represents the home node for memory block 208, which is shown in FIG. 5 as home node 508. Slave node 512 represents the node where the copy of memory block 208 currently resides. In row A, slave node 512 happens to be the same node as the home node, i.e., node 100.

The RTO request from node 104 (requesting node 502 in this first transaction) is forwarded to home node 100 (node 508) via path 504. The forwarding of the RTO transaction from the requesting node to the home node is typically handled by network infrastructure 12 utilizing the address provided with the RTO request. The network infrastructure 12 knows where the home node for a particular memory block is by, for example, mapping the block's address to the address ranges of the various nodes. When home node 100 (node 508) receives the RTO message, it sets the pending bit associated with the requested memory block 208. The setting of the pending bit signifies that memory block 208 is temporarily being accessed and is not available to service another memory access request pertaining to memory block 208. Further, home node 100 knows by checking with directory 212 (row A) that it has an exclusive M-copy of memory block 208, and all other nodes have invalid copies of memory block 208. Since it is also the node at which the copy resides (slave node 512), node 100 may be thought of in FIG. 5 as encompassing both home node 508 and slave node 512.

Node 100 (home node 508/slave node 512) then sends a copy of memory block 208 via path 514 to the requesting node 104 (node 502). Upon receiving a copy of memory block 208, requesting node 104 (node 502) then updates its copy to an exclusive M-copy and sends a confirmation message via path 506 to home node 100 (node 508). The receipt of the confirmation message by home node 100 (node 508) causes home node 100 to downgrade its own copy of memory block 208 to an invalid I-copy and to update its directory entry 212 (to that of row B) and permits the pending bit associated with memory block 208 to be reset, thereby allowing subsequent transactions involving memory block 208 to be serviced. As shown in transaction #1, the use of the pending bits and explicit messages between the requesting node, the home node, and the slave node (via paths 504, 506, 510, and 514) eliminates the need for a network-wide broadcast to service transaction #1.

Further, the use of the pending bit eliminates the requirement of a natural ordering mechanism since transactions can be queued by the receiving home node in the order in which they are received and serviced in that order whenever the pending bit becomes reset.

Transaction #2 (Row B to row D):

In transaction #2, node 102 acts as the requesting node and requests an exclusive copy of memory block 208 by issuing an RTO transaction. The RTO transaction is forwarded by network infrastructure 12 to the home node 100 of memory block 208, i.e., node 508 in transaction #2, via path 504 and causes home node 100 to set the pending bit associated with memory block 208. Network interface 12 knows that the message should be delivered to node 100 since it can ascertain the address of the memory block requested and knows which node in the network is the home node for the requested memory block.

Node 100 can ascertain from directory entry 212 (row B) that node 104 currently has the only exclusive M-copy of memory block 208. Accordingly, home node 100 (node 508) sends a request via path 510 to node 104 (the slave node) to request node 104 to forward a copy of memory block 208 to the requesting node, i.e., node 102 (requesting node 502). Node 104 is the slave node in this transaction since it represents the node where a valid copy of the requested memory block currently resides. Slave node 104 (node 512) downgrades its copy from an exclusive M-copy to an invalid I-copy since, by definition, if one node in the computer network has an exclusive M-copy, i.e., requesting node 102, all other nodes must have invalid I-copies.

When the requesting node 102 (node 502 in transaction #2) receives a copy of memory block 208, it internally notes that it now has an exclusive M-copy (row D, column 102) and acknowledges via path 506. When home node 100 (node 508) receives the acknowledgment message from the requesting node via path 506, it updates its copy to an invalid I-copy, if necessary (it turns out to be unnecessary in this case), updates directory entry 212 (to that of row D), and resets the pending bit associated with memory block 208 so that other transactions involving memory block 208 may be serviced.

Transaction #3 (Row D to Row A):

In transaction #3, node 102, which has had an exclusive M-copy, requests to write back the content of memory block 208 back to the home node 100. A node may want to write back the memory block it earlier cached for a variety of reasons, e.g., it wants to cache another memory block and does not have room in its memory cache. With reference to FIG. 4, requesting node 102 (node 502), sends a write-back (WB) transaction to the network infrastructure. The network infrastructure then routes this request to the home node of memory block 208, i.e., node 100. Upon receiving this WB request, home node 100 (node 508) sets the pending bit associated with memory block 208.

Home node 100 can determine that node 102 must have the exclusive copy by checking directory entry 212 (row D). Home node 100 (node 508) then sends a message via path 510 to slave node 512 (the node currently having the copy of memory block 208, which happens to be the same node as requesting node 102 in this write back transaction). Consequently, requesting node 502 and slave node 512 may be treated as a single entity in this transaction. Node 102 (slave node 512 requesting node 502) then sends a copy of memory block 208 via path 506 to home node 100 (node 508) where the content of memory block 208 is written into home node 100 (node 508). Once the content of memory block 208 is written back, directory entry 212 may be updated (to that of row A), and the pending bit associated with memory block 208 may then be reset.

Transaction #4: (Row D to Row E).

Node 104 wants a shared, read-only copy of memory block 208 and issues an RTS (read-to-share) request to the network infrastructure to request a read-only copy of memory block 208. Network infrastructure 12 then forwards the RTS request via path 504 from requesting node 104 (node 502) to the home node 100 (node 508).

By checking directory entry 212, home node 100 knows that node 102 currently has the exclusive M-copy of memory block 208 and all other nodes currently have invalid I-copies. Home node 100 then sends a message via path 510 to ask the slave node 102, which has an M-copy, to downgrade itself to an S-copy and forward a copy of memory block 408 to requesting node 104 (node 702). Slave node 102 (node 512) then sends a copy of memory block 208 to requesting node 104 (node 502) via path 514, and simultaneously downgrades the copy it has from an exclusive M-copy to a shared S-copy. Upon receiving a copy of memory block 208, requesting node 104 (node 502) then sends an acknowledgment message to home node 100 (node 508) via path 506, which causes directory entry 212 to be updated (to that of row E) and the pending bit associated with memory block 208 to be reset.

Transaction #5 (Row F to Row G)

In one embodiment, whenever there is a shared, read-only S-copy anywhere in the node, the home node may also retain a copy of the shared, read-only S-copy. The shared, read-only S-copy may be sent to home node 508 from, for example, the requesting node 502 (after it has received a copy of the memory block from the slave node), along with the acknowledgment message of path 506. Since the home node also has a shared, read-only S-copy, it can advantageously service a subsequent RTS request from another node in the computer network directly without having to ask another node in the network to forward a copy of the requested memory block to the requesting node. This transaction is illustrated as transaction #5 when the states of memory block 208 change from those of row F to row G of FIG. 4.

In transaction #5, nodes 100 and 102 currently have shared, read-only S-copies of memory block 208, and nodes 104 and 106 have invalid I-copies of the same memory block. Node 104 now wants a shared, read-only S-copy of memory block 208 and issues an RTS request, which arrives at home node 100 (node 508) via path 506. Since home node 100 (node 508) already has a shared S-copy (it either knows this by itself or by checking directory entry 212, i.e., row F), it does not need to request a copy of memory block 208 from any other node in the network, and in fact, does not care what other copies may exist on the nodes of the network. Consequently, home node 508 and slave node 512 may be thought of as the same entity, i.e., node 100, and may respond via path 514 to requesting node 104 (node 502) with a copy of memory block 208. Upon receiving a copy of memory block 208, requesting node 104 (node 502) acknowledges by sending a message via path 506 to home node 100 (home node 508/slave node 512), which causes directory entry 212 to be updated (to that of row G) and the pending bit associated with memory block 208 to be reset.

Transaction #6: (Row G to Row H)

In transaction #6, nodes 100, 102, and 104 have shared, read-only S-copies while node 106 has an invalid I-copy of memory block 208. Subsequently, node 106 (node 502 in FIG. 4) desires an exclusive M-copy and issues an RTO transaction to the network infrastructure 12. Network infrastructure 12 then forwards the RTO request to the home node of memory block 208, i.e., node 100, via path 504.

By checking directory entry 212 (row G), home node 100 (node 508) knows that it has a shared, read-only S-copy (row G, column 100), and that other nodes, i.e., nodes 102 and 104, also have shared, read-only S-copies. Home node 100 (node 508) must send messages to other nodes in the network, in a parallel manner in one embodiment, to request these slave nodes, i.e., nodes 100, 102, and 104, to downgrade their copies of memory block 208 to invalid I-copies.

Node 100 may treat itself as a slave node since a valid copy of memory block 208 currently resides on node 100. Consequently, home node 508 and slave node 512 may be thought of as the same entity, i.e., node 100. One consequence of this is that any messages sent between these two entities may be thought of a null operation. Home node 100 (home node 508/slave node 512) then sends a copy of memory block 208 via path 514 to requesting node 106 (node 502).

Home node 100 (home node 508/slave node 512) also sends to requesting node 106 (node 502) information regarding the number of slave nodes in the network to whom it has sent the request to downgrade. This information is kept by requesting node 106 (node 502). All the slave nodes to whom home node 508 sent the message (via path 510) to downgrade themselves, also report to requesting node 106 (node 502) to acknowledge that they have downgraded their copies from shared S-copies to invalid I-copies. Requesting node 106 (node 502) then counts the number of acknowledgments to ensure that all slave nodes that need to downgrade their copies in the network have acknowledged.

Once requesting node 106 (node 502) is satisfied that all the nodes that need to downgrade their copies have done so, requesting node 106 (node 502) then sends an acknowledgment message via path 506 to home node 100 (node 508) to allow the home node 100 to update directory entry 212 (to that of row H) and to reset the pending bit associated with memory block 208.

Although the directory protocol eliminates the need for natural ordering and natural broadcasting in a computer network when servicing memory access requests, the requirement of a directory entry for every memory block in a node represents a significant memory overhead. This memory overhead can become quite significant for nodes having a large number of memory blocks. In some systems, for example, the implementation of a directory may require a memory overhead of up to 3%. For this reason, directories are sometimes implemented with less expensive, albeit slower, memories such as dynamic random access memories (DRAM).

Slower memories, however, impose a performance penalty on systems adopting the directory protocol. As a result, many attempts have been made to optimize the speed at which directory entries may be accessed in the directory protocol to expedite the fulfillment of memory access requests. FIG. 6 represents a directory-cache protocol to optimizing DSM access using directories. In FIG. 6, there is shown a directory unit 600, which contains a directory 601 and a directory cache 604. Directory 601 contains directory entries 602, each of which generally corresponds to a unique memory block in a memory module of a node, e.g., memory module 204 of node 100 of FIG. 3. In one embodiment, each directory entry 602 in directory 601 includes a field for storing the directory states of the corresponding memory blocks in the nodes of the computer network.

Directory cache 604 is provided to improve access speed to directory entries 602. Directory cache 604 may be implemented with a faster type memory than that employed to implement directory 601, e.g., static RAM. Directory cache 604 contains directory cache entries 603, representing a subset of directory entries 602 that have been cached by some node in the network. Each directory cache entry 603 may include a field for indicating whether the directory entry is valid, another field for storing the address of the corresponding memory block being cached, and yet another field for storing the directory states of the corresponding memory blocks in the nodes of the network. Functionally speaking, directory unit 600 may be thought of as a single unit performing the equivalent function of directory 210 of FIG. 3, albeit with improved speed.

In accordance with the directory-cache protocol, when access to a memory block is desired, directory cache 604 is checked first to determine whether the directory entry corresponding to the requested memory block already exists in directory cache 604. If the directory entry corresponding to the requested memory block already exists in directory cache 604, i.e., if there is a cache hit, the speed at which this directory entry can be read and modified is substantially improved, thereby improving the speed at which a memory access request can be serviced by the home node of the requested memory block.

In the event of a cache miss (i.e., the directory entry corresponding to the requested memory block cannot be found in directory cache 604), however, the directory protocol dictates that an appropriate directory entry must be cached into directory cache 604 from directory 601. Once the appropriate directory entry is cached, it can then be consulted to facilitate the servicing of the memory access request. After the memory access request which requested the memory block is serviced, the cached directory entry may then be modified to reflect the states of its corresponding memory block in the network nodes.

Although the directory-cache protocol represents an improvement in the speed at which directory entries may be accessed and modified (and by extension, the speed at which memory access requests can be serviced), there is room for further refinement. As mentioned earlier, for example, when there is a directory cache miss, it is necessary in the directory protocol to access directory 601 to cache the required directory entry. The caching of a directory entry from directory 601 represents a non-trivial delay in the processing of memory access requests. This delay is further compounded by the fact that directory 601, due to its size in a typical application, is usually implemented in less costly and slower memories.

Further, the caching of required directory entries into directory cache 604 necessitates cache write back operations whenever directory cache 604 is full. A cache write back operation, which creates room for caching additional directory entries in directory cache 604, represents another nontrivial delay in the processing of a memory access request. Furthermore, the logic required to control a directory cache is not trivial, requiring considerable design and verification efforts to ensure its proper implementation and operation.

In view of the foregoing, what is desired are methods and apparatus that permit directory entries corresponding to memory blocks of a network's distributed shared memory to be accessed in a efficient manner in the servicing of memory access requests.

SUMMARY OF THE INVENTION

The invention relates, in one embodiment, to a method in a computer network for permitting a first node of the computer network to access a copy of a memory block of a memory module that has a home node different from the first node in the computer network. The network has a first plurality of nodes coupled to a common network infrastructure and a distributed shared memory distributed among the first plurality of nodes. The computer network further has no natural ordering mechanism and natural broadcast for servicing memory access requests by the plurality of nodes. The home node has a partial directory cache that has fewer directory cache entries than a total number of memory blocks in the memory module.

The method includes the step of receiving via the common network infrastructure at the home node from the first node a first memory access request for the memory block. There is further included the step of servicing, if directory states representing states of copies of the memory block on the first plurality of nodes are cached in a directory cache entry of the partial directory cache, the first memory access request using a directory protocol. In accordance with the directory protocol, the memory access request is serviced by consulting the directory cache entry to determine which node in the computer network currently possesses a first valid copy of the memory block. The first valid copy of the memory block represents a valid copy of the memory block that is capable of servicing the first memory access request.

There is further included the step of servicing, if the directory states related to the memory block are not cached in the partial directory cache, the first memory access request using a directory-less protocol. In accordance with the directory-less protocol, the partial directory cache is not consulted, upon determining that the directory states related to the memory block are not cached in the partial directory cache, in servicing the first memory access request.

In another embodiment, the invention relates to a network node for coupling in a computer network having a first plurality of nodes coupled to a common network infrastructure and a distributed shared memory distributed among the first plurality of nodes. The computer network has no natural ordering mechanism and natural broadcast for servicing memory access requests by the plurality of nodes. The network node permits a first node of the computer network different from the network node to access a copy of a memory block of a memory module that has a home on the network node.

The network node includes a partial directory cache having fewer directory cache entries than a total number of memory blocks in the memory module. The network node further includes means for receiving from the common network infrastructure, when the network node is coupled in the computer network, at the network node from the first node a first memory access request for the memory block. Further, there is included means for servicing, if directory states representing states of copies of the memory block on the first plurality of nodes are cached in a directory cache entry of the partial directory cache, the first memory access request using a directory protocol. In accordance with the directory protocol, the directory cache entry is consulted to determine which node in the computer network currently possesses a first valid copy of the memory block. The first valid copy of the memory block represents a valid copy of the memory block that is capable of servicing the first memory access request.

There is also included means for servicing, if the directory states related to the memory block are not cached in the partial directory cache, the first memory access request using a directory-less protocol. In accordance with the directory-less protocol, the partial directory cache is not consulted, upon determining that the directory states related to the memory block are not cached in the partial directory cache, in servicing the first memory access request.

In yet another embodiment, the invention relates to a method, in a computer network having a first plurality of nodes coupled to a common network infrastructure and a distributed shared memory distributed among the first plurality of nodes, for servicing a memory access request by a first node of the first plurality of nodes. The memory access request pertains to a memory block of a memory module that has a home node different from the first node in the computer network. The home node has a partial directory cache that has fewer directory cache entries than a total number of memory blocks in the memory module.

The method includes the step of receiving via the common network infrastructure at the home node from the first node the first memory access request for the memory block. There is included the step of ascertaining whether the memory block is currently cached in the partial directory cache. Additionally, there is included the step of servicing, if the memory block is currently cached in the partial directory cache, the first memory access request using a directory protocol. In accordance with the directory protocol, the partial directory cache is consulted to determine which node in the computer network currently possesses a first valid copy of the memory block. The first valid copy of the memory block represents a valid copy of the memory block that is capable of servicing the first memory access request.

The method includes the step of servicing, if the memory block is not currently cached in the partial directory cache, the first memory access request using a directory-less protocol. In accordance with the directory-less protocol, the partial directory cache is not consulted, upon determining that the memory block is not currently cached in the partial directory cache, in servicing the first memory access request.

These and other advantages of the present invention will become apparent upon reading the following detailed descriptions and studying the various figures of the drawings.

DETAILED DESCRIPTION OF THE PREFERRED EMBODIMENTS

An invention related to a hybrid protocol is described for permitting nodes of a computer network to access the network's distributed shared memory in an efficient manner. In the following description, numerous specific details are set forth in order to provide a thorough understanding of the present invention. It will be obvious, however, to one skilled in the art, that the present invention may be practiced without some or all of these specific details. In other instances, well known structures and process steps have not been described in detail in order not to unnecessarily obscure the present invention.

In accordance with one aspect of the present invention, there is provided a hybrid protocol for permitting the home node of a requested memory block to take advantage of a directory cache hit. Utilizing the information contained in the cache's directory entry, a memory access request may be rapidly serviced in the manner associated with the aforementioned directory protocol.

In the event of a directory cache miss, i.e., there is not a directory entry that corresponds to the requested memory block in the directory cache, a directory-less protocol is advantageously employed. As the name implies, the directory-less protocol permits the home node to service a memory access request from any node in the network without employing information that is typically provided in a directory entry associated with the directory protocol.

Figure 1:
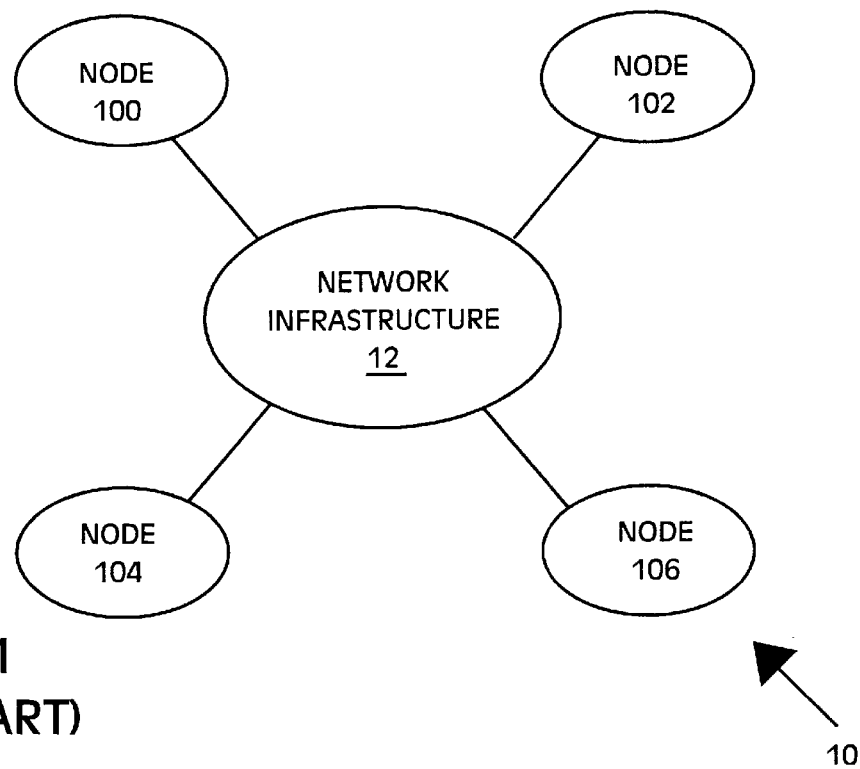
FIG. 1 illustrates, for discussion purposes, a computer network having a plurality of nodes and a network infrastructure.
Figure 2:
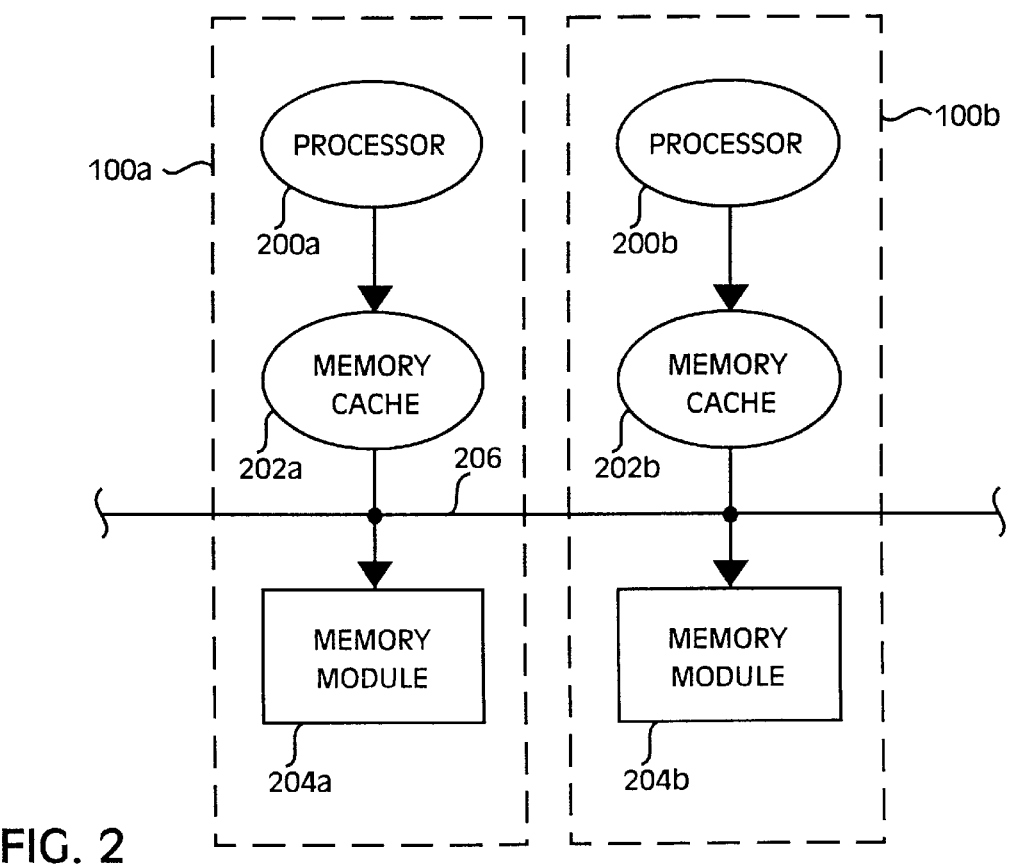
FIG. 2 is a schematic of a computer network node for implementing one version of the prior art bus-based protocol.
Figure 7:
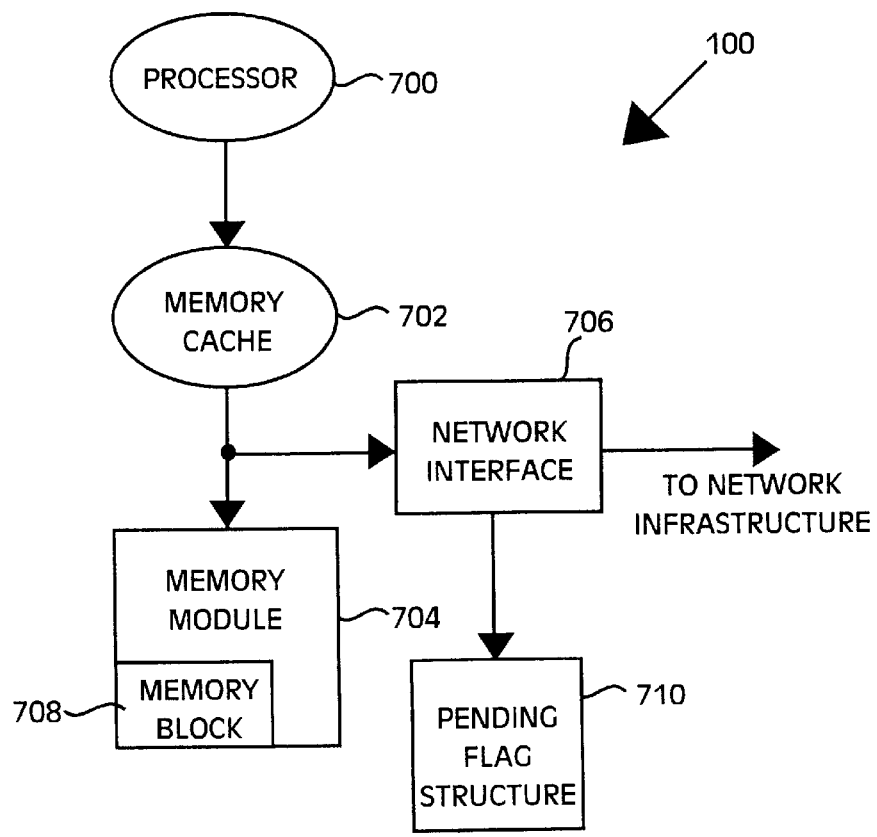
FIG. 7 illustrates, for discussion purposes, a computer network node for implementing the directory-less protocol.

The directory-less protocol will now be discussed in detail in connection with FIGS. 7–10. FIG. 7 shows a schematic of a computer network node, such as node 100 of FIG. 1, that is suitable for implementing the directory-less protocol. In FIG. 7, node 100 is shown having a processor 700. Processor 700 is coupled to a memory cache 702, which is employed to cache requested memory blocks. The memory blocks cached by memory cache 702 represent memory blocks requested by node 100. The home node of a cached memory block may be the same node as the node on which the directory is kept or another node in the network.

Both memory cache 702 and memory module 704 are coupled to a network interface 706. Network interface 706 represents the circuit that allows node 100 to communicate with the network infrastructure, such as network infrastructure 12 of FIG. 1. Memory module 704 typically has an address range that is different from the address ranges associated with other memory modules in the network. The union of all memory modules 704 in a network make up the distributed shared memory (DSM). Memory module 704 further contains all the memory blocks of a node. When the network is quiescent, every memory block has a home node. As mentioned earlier, node 100 can be as simple as a single processor having a cache or as complicated as a complete bus-based multiprocessor system.

To implement the directory-less protocol, there is provided a pending flag structure 710. Pending flag structure 710 is coupled to network interface 706. Pending flag structure 710 represents the memory structure for storing the flag that signifies whether a particular memory block, e.g., memory block 708, is currently being accessed by a network node and should not be read or written to by another node. When the pending flag is set, access to the associated memory block is prohibited to other network nodes. When the pending flag is reset, the associated memory block is available for servicing the next transaction that requests it.

Figure 8A:
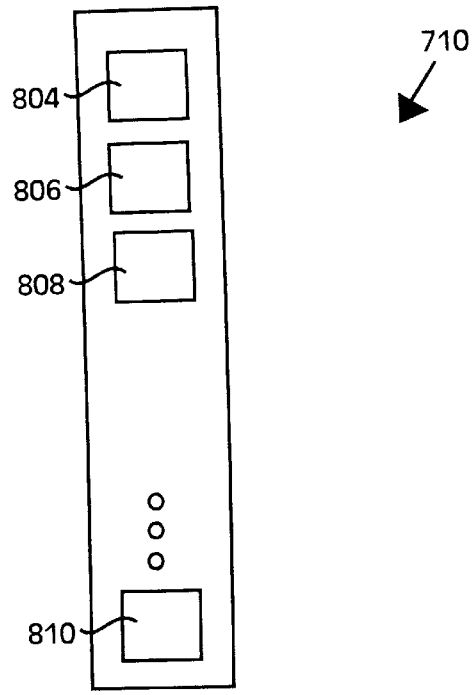
FIGS. 8A and 8B illustrate, in accordance with different aspects of the present invention, the organization of a pending flag structure in the directory-less protocol.

Pending flag structure 710 may be implemented by providing a flag (which may be one bit although multiple bits may be employed as well) for every memory block of memory module 704. Some predefined relationship between the addresses of the memory blocks in memory module 704 and the addresses of flags in the pending flag structure may permit node 100 to ascertain the unique memory block associated with each flag. By way of illustration, when the address of memory module 704 is increased by 64, the address in the pending flag structure may increase by, for example, one. FIG. 8A illustrates this implementation wherein pending flags 804–810 map to the memory blocks of memory module 704, using some conventional mapping technique, e.g., the mapping technique described above.

Figure 8B:
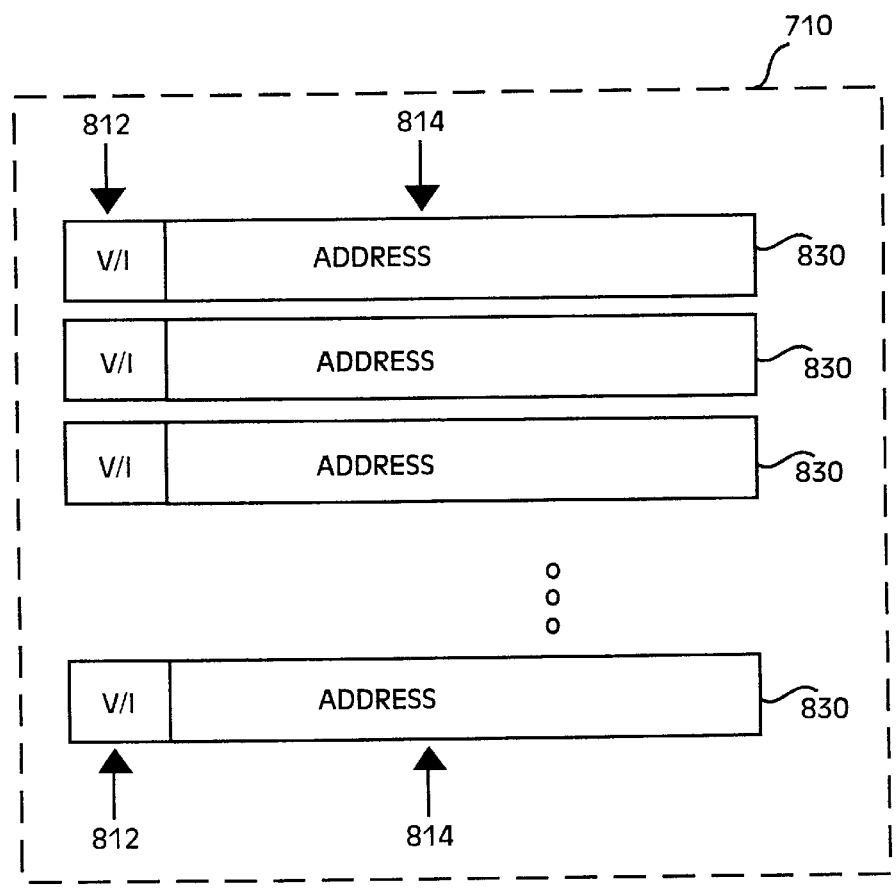

It is not required that each memory block has an associated pending flag in pending flag structure 710. As illustrated in FIG. 8B, each pending structure entry 830 in pending flag structure 710 is implemented by a pending flag field 812 and an address field 814. When a memory block is "pending," its address is entered into address field 814 of a pending structure 830 and the pending flag in pending flag field 812 is set. The number of pending structure entries 430 in pending flag structure 710 may be smaller than the number of memory blocks in memory module 704 to reduce the memory overhead. The implementation of FIG. 8B is advantageous for network nodes that have a relatively large memory module 704 since only a small number of memory blocks is typically cached at any given time and the number of pending structure entries 430 may be kept relatively small. The number of pending structure entries 430 may vary greatly from system to system, depending on the number of memory blocks expected to be cached at any given point in time (which number may be statistically determined for a particular network).

Figures 3, 4:
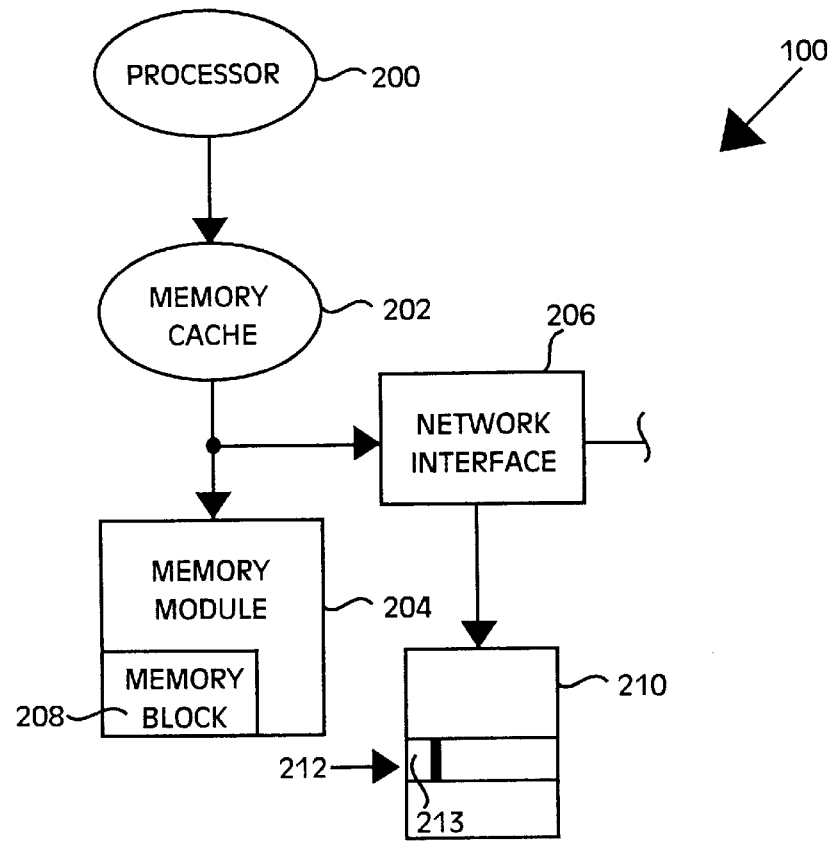
FIG. 3 illustrates, for discussion purposes, a computer network node for implementing the prior art directory protocol.
FIG. 4 illustrates, for discussion purposes and responsive to various memory access requests, the states of a memory block in the nodes of the network of FIG. 1.
Figure 5:
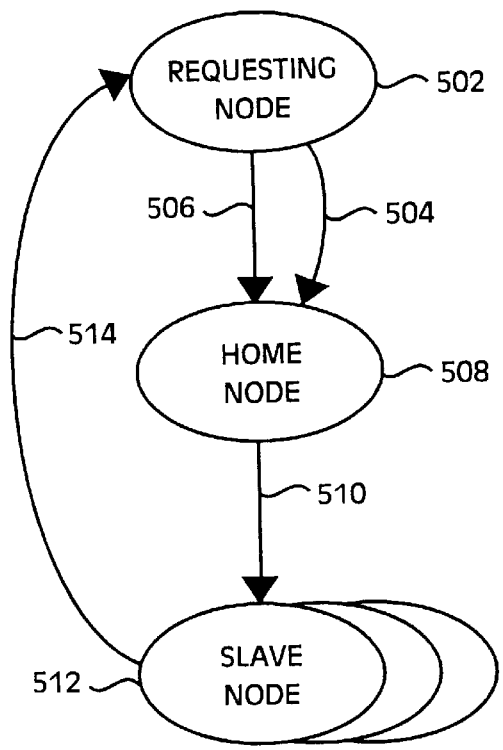
FIG. 5 is a state diagram illustrating the various communication paths between a requesting node, a home node, and a slave node in servicing memory access requests.
Figure 9:
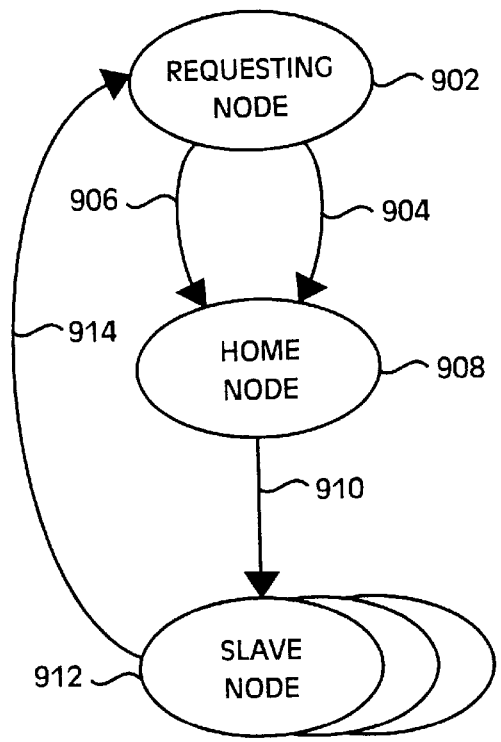
FIG. 9 is a state diagram illustrating the various communication paths between a requesting node, a home node, and a slave node in servicing memory access requests in the directory-less protocol.

The operation of the present directory-less protocol may be best illustrated with reference to the examples of FIG. 4 and the state diagram of FIG. 9. In FIG. 4, there are shown in rows A–H the states for memory block 708 of node 100 of FIG. 7 in the four nodes of the network. It should be borne in mind that although a single memory block 708 is discussed in detail herein to simplify the illustration, caching is typically performed on a plurality of memory blocks. It should also be borne in mind that the number of nodes in a network may be varied according to needs. Further, the matrix of FIG. 4 is shown herein for discussion purposes only. In the directory-less protocol, it is not necessary to create and maintain a centralized matrix or directory in computer memory.

In row A, node 100 is shown to have an exclusive M-copy of memory block 708 (M state in row A, column 100). By definition, all other network nodes must have invalid copies of memory block 708 (shown by state I in row A, columns 102–106). Incidentally, the M-copy of memory block 708 is currently cached by the memory cache in its home node 100.

Transaction #1 (Row A to row B of FIG. 4):

Suppose node 104 now desires an exclusive M-copy of memory block 708, which, as shown in row A, currently resides at its home node 100. With reference to FIG. 4, node 104 represents the requesting node 902, while node 100 represents the home node for memory block 708, which is shown in FIG. 4 as home node 908. Slave node 912 represents the node where the copy of memory block 708 currently resides. In row A, slave node 912 happens to be the same node as the home node, i.e., node 100.

The RTO request from node 104 (requesting node 902 in this first transaction) is forwarded to home node 100 (node 908) via path 904. The forwarding of the RTO transaction from the requesting node to the home node may be handled by network infrastructure 12 utilizing the address provided with the RTO request. The network infrastructure 12 knows where the home node for a particular memory block is by, for example, mapping its address to the address ranges of the various nodes. When home node 100 (node 908) receives the RTO message, it sets the pending flag associated with the requested memory block 708. Further, it knows that it has an exclusive M-copy of memory block 708, and can therefore infer that all other nodes must have invalid copies of memory block 708. Since it is also the node at which the copy resides (slave node 912), node 100 may be thought of in FIG. 9 as encompassing both home node 908 and slave node 912.

Node 100 (home node 908/slave node 912), then sends a copy of requested memory block 708 via path 914 to requesting node 104 (node 902). Upon receiving a copy of memory block 708, requesting node 104 (node 902) then updates its copy to an exclusive M-copy and sends a confirmation message via path 906 to home node 100 (node 908). The receipt of the confirmation message by home node 100 (node 908) permits the pending flag associated with memory block 708 to be reset, thereby allowing subsequent transactions involving memory block 708 to be serviced. As shown in transaction #1, the use of the pending flags and explicit messages between the requesting node, the home node, and the slave node (via paths 904, 906, 910, and 914) eliminates the need for a network-wide broadcast to service this RTO transaction #1.

Further, the use of the pending flag eliminates the requirement of a natural ordering mechanism, since transactions can be queued by the receiving home node in the order in which they are received and serviced in that order whenever the pending flag becomes reset. As can be appreciated by those skilled in the art, the number of messages sent in the network is advantageously the same for transaction #1 in the directory-less protocol as in the implementation involving the directory protocol, i.e., there is no performance penalty involved in employing the directory-less protocol for transaction #1. Advantageously, however, the directory as well as its attendant complexities and memory/transaction overhead is not required in the inventive directory-less protocol.

Transaction #2 (Row B to row D):

In transaction #2, node 102 acts as the requesting node and requests an exclusive copy of memory block 708 by issuing an RTO transaction. The RTO transaction is forwarded by network infrastructure 12 to the home node 100 of memory block 708, i.e., node 908 in transaction #2, via path 904 and causes home node 100 to set the pending flag associated with memory block 708.

Since node 100 only knows that it has an invalid copy of memory block 708 (row B, column 100) and it has no directory entry to consult in the directory-less protocol, node 100 does not know where in the network a valid copy of memory block 708 may be found. However, node 100 needs to request the node that currently has the copy of memory block 708 forward that copy to requesting node 102. Consequently, home node 100 (node 908) sends a request via path 910, in a parallel manner in one embodiment, to all other nodes in the network except the requesting node (node 102 in transaction #2), and itself (node 100). In this case, the number of messages that are sent out through network interface 12 from the home node is therefore Total-2 where Total represents the total number of nodes in computer network 10.

If a node receiving the message from home node 100 cannot respond to the request to forward a copy of memory block 708 to the requesting node, i.e., it does not have a valid copy of memory block 708, that receiving node merely ignores the request from the home node. In this transaction, node 104, which currently has the only exclusive copy of memory block 708 (as shown in row B), responds via path 914 to the requesting node 102 (node 902 in transaction #2). Node 104 is the slave node in this transaction since it represents the node where a valid copy of the requested memory block currently resides. Node 104 (slave node 912) downgrades its copy from an exclusive M-copy to an invalid I-copy, since by definition, if one node in the computer network has an exclusive M-copy, i.e., requesting node 102, all other nodes must have invalid I-copies.

When the requesting node 902 (node 102 in transaction #2) receives a copy of memory block 708, it internally notes that it now has an exclusive M-copy (row D, column 102) and acknowledges via path 906. When home node 100 (node 908) receives the acknowledgment message from the requesting node via path 906, it updates its copy, if necessary (it turns out to be unnecessary in this case), and resets the pending flag associated with memory block 708 so that other transactions involving memory block 708 may be serviced.

As can be appreciated from the discussion regarding transaction #2, when the home node does not have the exclusive M-copy of a memory block and receives an RTO request pertaining to that memory block, the number of messages it must send via network infrastructure 12 to request another node to facilitate the forwarding of a copy of the requested memory block to the requesting node is at least Total-2. Of the messages sent, the number of messages that is "wasted," i.e., ignored by the receiving slave nodes, is Total-3 (since one of the receiving nodes is the node that can respond by sending a valid copy of memory block 708 to the requesting node). Thus, in transaction #2, the number of messages that must be sent by the home node via network infrastructure 12 to service the RTO request may be greater than in the case of the directory protocol. For relatively small networks that have a relatively small number of nodes, the number of messages wasted may, however, be justified by the substantially simpler implementation of the directory-less protocol.

Transaction #3 (Row D to Row A):

In transaction #3, node 102, which had an exclusive M-copy, requests to write back the content of memory block 708 back to home node 100. A node may want to write back a memory block it earlier cached for a variety of reasons, e.g., it wants to cache another memory block and does not have room in its memory cache. With reference to FIG. 4, requesting node 102 (node 902), sends a write-back (WB) transaction to the network infrastructure. The network infrastructure then routes this request to the home node of memory block 708, i.e., node 100 via path 904. Upon receiving this WB request, home node 100 (node 908) sets the pending flag associated with memory block 708.

Although home node 100 only has an invalid I-copy of memory block 708 (as shown in row D, column 100 of FIG. 4), it can infer that since node 102 requests a write-back, node 102 must have the exclusive M-copy of memory block 708. Consequently, home node 100 (node 908) sends a message via path 910 to slave node 912 to request it to write back. Slave node 912 represents the node currently having the copy of memory block 708, which happens to be the same node as requesting node 102 in this write back transaction. Consequently, requesting node 902 and slave node 912 may be treated as a single entity in this transaction. Node 102 (slave node 912/requesting node 902) then sends a copy of memory block 708 via path 906 to home node 100 (node 908) where the content of memory block 708 is written into home node 100 (node 908). Once the content of memory block 708 is written back, the pending flag associated with memory block 708 may then be reset.

In transaction #3, a possible race condition exists if the write-back request from node 102 is delayed in arriving at home node 100, and meanwhile another node in the network issues a transaction concerning memory block 708, which gets serviced before the write back request from requesting node 102 arrives at home node 100. In this situation the home node 100, upon receiving the later-issued-but-sooner-arrived transaction request may, seeing that the pending flag associated with memory block 708 has not been set, proceed to service this later issued request.

The servicing of this later-issued request may cause the copy of memory block 708 to be moved from node 102. When the write-back request from node 102 finally arrives at home node 100 and is serviced, node 102 may no longer have an exclusive M-copy of memory block 708. When a home node, e.g., node 100, receives a write-back request, it can simply respond via path 910 to the requesting/slave node to ask the requesting/slave node to write-back only if the requesting/slave node still has an exclusive M-copy of the memory block. Otherwise, the home node simply ignores the received write-back request. Advantageously, by responding to the node requesting the write-back in this manner, possible race conditions are advantageously avoided.

Transaction #4: (Row D to Row E).

Node 104 wants a shared, read-only copy of memory block 708 and issues an RTS (read-to-share) request to the network infrastructure to request a read-only copy of memory block 708. Network infrastructure 12 forwards the RTS request via path 904 from requesting node 104 (node 902), to home node 100 ( node 908), which causes the pending flag associated with memory block 708 to be set.

Home node 100 only knows that it has an invalid I-copy (row D, column 100). Without the knowledge of which node in the network has a shared S-copy or an exclusive M-copy, home node 100 (node 908) must broadcast a request to all remaining nodes in the network to ask the node which has an M-copy to downgrade itself to a S-copy and forward a copy of requested memory block 708 to requesting node 104 (node 902). The number of requests sent via path 910 from home node 100 (node 908) to the remaining nodes in the computer network, is again Total-2 (there is no need to send a request to the home node or the node that requests a copy of memory block 708).

In this case, node 102 represents the slave node which previously had the exclusive M-copy (row D, column 102). Slave node 102 (node 912) then sends a copy of memory block 708 to requesting node 104 (node 902), and simultaneously downgrades the copy it has from an exclusive M-copy to a shared S-copy (from row D, column 102 to row E, column 102). Upon receiving a copy of memory block 708, requesting node 104 (node 902) then sends an acknowledgment message to home node 100 (node 908) which resets the pending flag.

Transaction #5 (Row F to Row G)

Whenever there is a shared, read-only S-copy anywhere in the node, the home node may also retain a shared, read-only S-copy. The shared, read-only S-copy may be sent to home node 908 from, for example, the requesting node 902 (after it has received a copy of the requested memory block from the slave node), along with the acknowledgment message in path 906. Since the home node has a shared, read-only S-copy, it can advantageously service a subsequent RTS request from another node in the computer network without having to ask another node to forward its copy to the requesting node. This transaction is illustrated as transaction #5 when the states of memory block 708 change from those of row F to row G of FIG. 4.

In transaction #5, nodes 100 and 102 currently have shared, read-only S-copies of memory block 708, and nodes 104 and 106 have invalid I-copies of the same memory block. Node 104 now wants a shared, read-only S-copy of memory block 708 and issues an RTS request which arrives at home node 100 (node 908) via path 906 and causes the pending flag associated with memory block 708 to be set. Since home node 100 (node 908) already has a shared S-copy, it does not need to request a copy of memory block 708 from any other node in the network, and in fact, does not care what other copies may exist on the nodes of the network. Consequently, home node 908 and slave node 912 may be thought off as the same entity, i.e., node 100, and may respond via path 914 to requesting node 104 (node 902) with a copy of memory block 708. Upon receiving a copy of memory block 708, requesting node 104 (node 902) acknowledges by sending a message via path 906 to home node 100 (home node 908/slave node 912), causing the pending flag associated with memory block 708 to be reset.

Transaction #6: (Row G to Row H)

In transaction #6, nodes 100, 102, and 104 have shared, read-only S-copies while node 106 has an invalid I-copy of memory block 708. Subsequently, node 106 (node 902 in FIG. 4) desires an exclusive M-copy and issues an RTO transaction to the network infrastructure 12. Network infrastructure 12 forwards the RTO request to the home node of memory block 708, i.e., node 100, via path 904, which causes the pending flag associated with memory block 708 to be set. Since home node 100 (node 908) only knows that it has a shared, read-only S-copy (row G, column 100), and there is no centralized directory in the home node in accordance with the directory-less protocol for it to consult, home node 100 (node 908) must send messages to other nodes in the network to request them to downgrade their copies of memory block 708 to invalid I-copies if they previously had shared, read-only S-copies. Again, the number of messages that must be sent via path 910 to other nodes in the network is Total-2 (since there is no need for home node 100 to send a message to itself or to the requesting node).

Further, node 100 may treat itself as a slave node since a valid, albeit shared, copy of memory block 708 currently resides on node 100. Consequently, home node 908 and slave node 912 may be thought of as the same entity, i.e., node 100. Home node 100 (home node 908/slave node 912) then sends a copy of memory block 708 via path 914 to requesting node 106 (node 902).

Home node 100 (home node 908/slave node 912) also sends to requesting node 106 (node 902) information regarding the number of slave nodes in the network to whom it has sent the request to downgrade. This information is kept by requesting node 106 (node 902). Each slave node to whom home node 908 sent the message (via path 910) to downgrade itself, also reports to requesting node 106 (node 902) via path 914 to acknowledge that it either has downgraded its copy from a shared S-copy to an invalid I-copy, or that it already has an invalid I-copy and does not need to downgrade further. Requesting node 106 (node 902) then counts the number of acknowledgments to ensure that all slave nodes in the network have acknowledged.

Once requesting node 106 (node 902) is satisfied that all the nodes that need to downgrade their copies have done so, requesting node 106 (node 902) then sends an acknowledgment message via path 906 to home node 100 (node 908) to allow home node 100 to reset the pending flag associated with memory block 708. Again, it should be noted that the use of these explicit messages and the pending flags advantageously eliminate the need to have an ordering circuit, such as an arbiter circuit, in the network to facilitate natural ordering.

As can be appreciated by those skilled in the art from the foregoing, the directory-less protocol has an advantage over the bus-based broadcast method since, in the worst case, the number of messages that need to be sent to the slaves is two less than the total number of nodes in the network. In the best case, e.g., in transaction #1, the number of messages that are sent is as few as required in the directory protocol. Specifically, the inventive directory-less protocol advantageously eliminates the need to broadcast a request to every node in the network when the home node has an M-copy and responds to an RTO or an RTS request from another node. Likewise, no broadcasting is necessary when the home node has a S-copy and responds to a RTS transaction request from another node.

However, a pure directory-less protocol is inherently slow compared to the directory or directory-cache protocols since a large number of messages are required, on average, to service memory access requests. The directory or directory-cache protocol can reduce the number of messages that need to be sent to other nodes of the network in servicing memory access requests, thereby improving speed. As mentioned earlier, however, a pure directory or directory-cache protocol has the disadvantage of a high memory overhead to implement a directory entry for every memory block of the network nodes.

In accordance with one aspect of the present invention, there is provided a hybrid protocol for servicing memory access requests. The inventive hybrid protocol advantageously does not require the implementation of a directory entry for every memory block (as in the case of the directory protocol or the directory-cache protocol). Further, the inventive hybrid protocol can advantageously improve the speed at which memory access requests can be serviced by taking advantage of directory entries, if they exist in a partial directory cache, to expedite memory access requests.

In the hybrid protocol, only a partial directory cache is required. A partial directory cache stores only a small number of the cached directory entries and requires less memory to implement since it is not necessary to provide a directory entry for every memory block of a network node.

Figure 6:
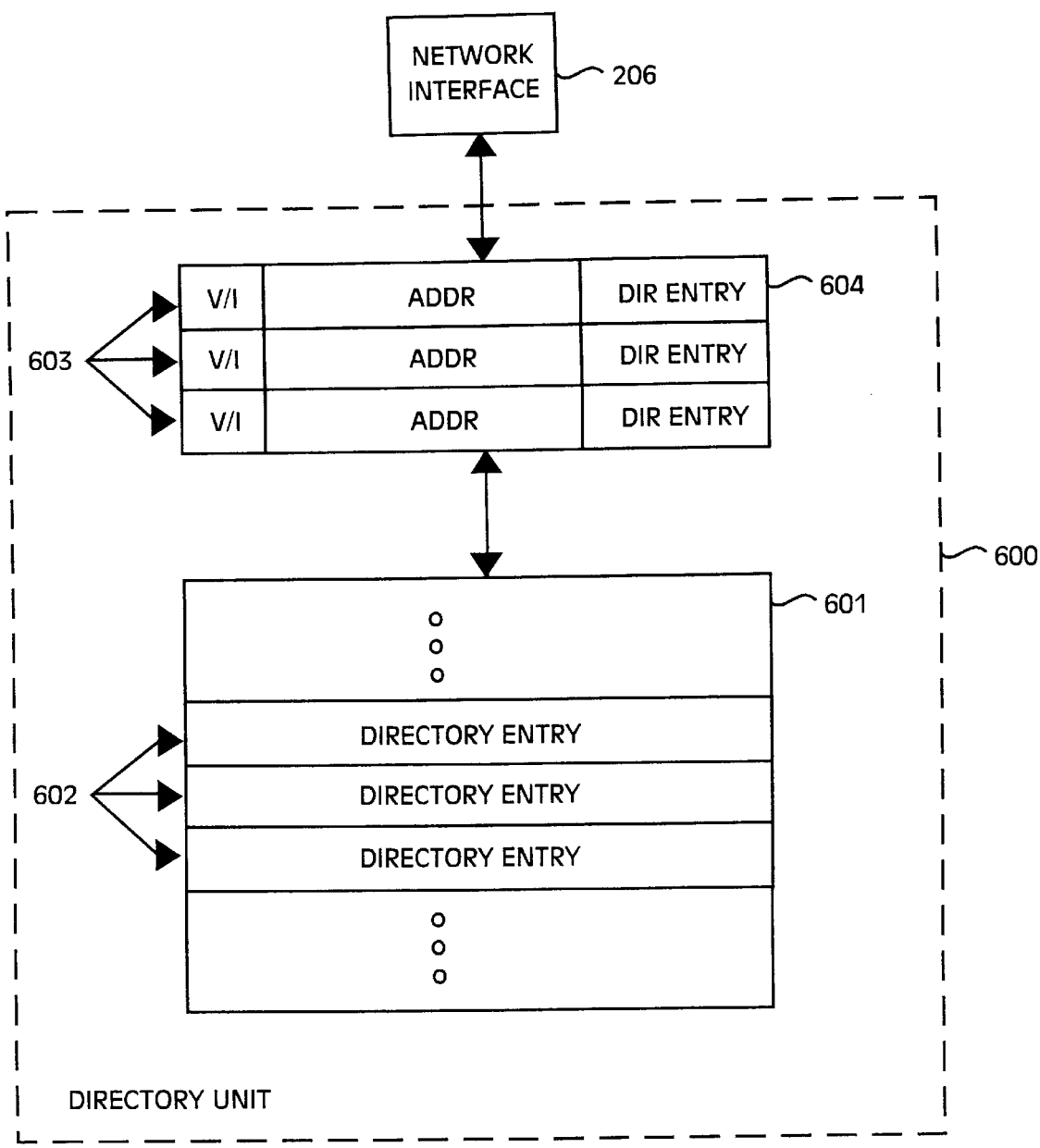
FIG. 6 is a diagram showing a directory and a directory cache for implementing the directory-cache protocol.
Figure 10:
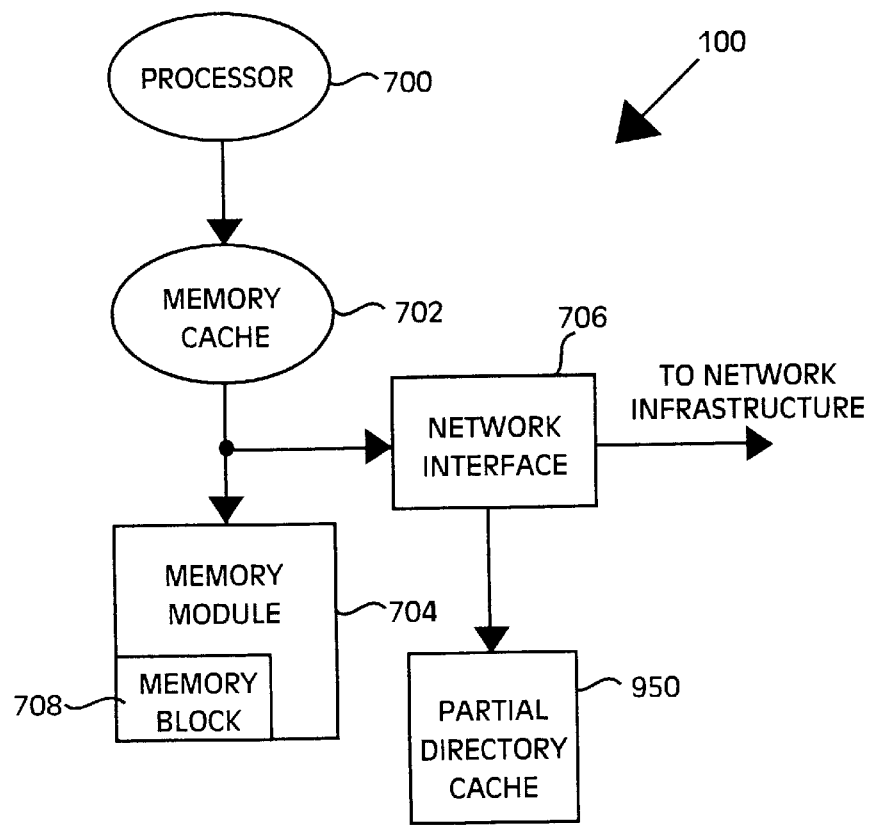
FIG. 10 illustrates, in accordance with one aspect of the present invention, a computer network node for implementing the hybrid protocol.

FIG. 10 is a diagram of a network node for implementing, in accordance with one embodiment of the present invention, the hybrid protocol. In FIG. 10, processor 700, memory cache 702, memory module 704, memory block 708, and network interface 706 are substantially the same as elements having like numbers in FIG. 7. There is provided in FIG. 10 a partial directory cache 950 for caching a predefined number of directory entries corresponding to memory blocks of memory module 704. Each directory entry in partial directory cache may, in one embodiment, be substantially similar to a directory cache entry 603 of FIG. 6. In other words, there may be provided a field for indicating whether the directory entry is valid, another field for storing the address of the corresponding memory block, and yet another field for storing the directory states of the corresponding memory blocks in the nodes of the network.

The predefined number of directory entries may vary depending on needs. For nodes whose memory blocks may be requested often, the predefined number of directory entry slots in partial directory cache 950 may be increased to expedite the servicing of memory access requests. Partial directory cache 950 may be chosen to be of a suitable size so that a reasonable number of commonly used memory blocks would be cached most of the time. In one embodiment, there may be fewer directory entry slots in partial directory cache 950 than there are memory blocks in the memory module residing at the same node.

In accordance with the inventive hybrid protocol, in the event of a partial directory cache hit, i.e., if the directory entry corresponding to the requested memory block exists in partial directory cache 950, the directory protocol is advantageously employed. When there is a partial directory cache miss, however, the directory-less protocol is advantageously employed. It should be apparent to one skilled in the art at this point that unless there exists a procedure for deciding when directory states pertaining to a particular memory block should be cached into a directory entry in partial directory cache 950, a partial directory cache 950 that may be empty upon start-up will always remain empty. If this situation is not rectified, the hybrid protocol essentially becomes a directory-less protocol since there is no migration path to move from the directory-less protocol into the directory protocol.

In accordance with one aspect of the present invention, the transition from the directory-less protocol to the directory protocol occurs when there is a renewal point with respect to the states of a particular memory block in the nodes of the network. Mathematically speaking, a renewal point refers to the point at which past transactions regarding an entity, e.g., a requested memory block in this case, can be ignored. At this renewal point, the states of the memory block at various nodes of the network may be ascertained simply from the most recently completed transaction without regard to any past history.

In accordance with one aspect of the present invention, there exists a renewal point upon the completion of a request for an exclusive, M-copy of a memory block (an RTO request). The conclusion of an RTO transaction represents a renewal point because if, for example, an RTO request is issued by node 102, node 102 would have the only exclusive M-copy of the memory block at the successful conclusion of the RTO transaction, and all other nodes in the network must, by definition, have invalid I-copies of that memory block. When the renewal point is detected, the directory entry related to the requested memory block can advantageously be inferred and cached into a directory entry in partial directory cache 950 without having to poll other nodes of the network to inquire about the states of the requested memory block in the nodes of the network.

Figure 11:
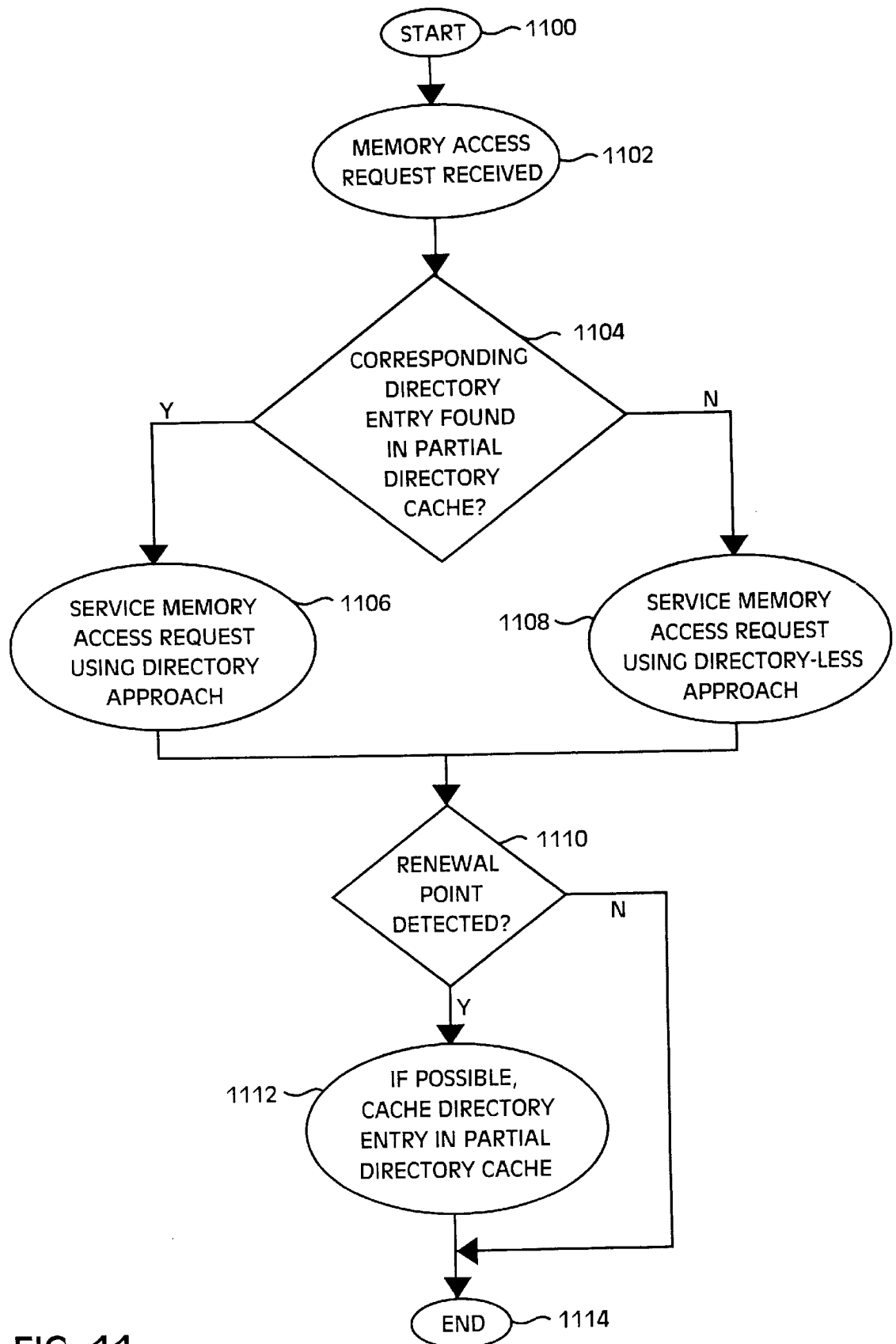
FIG. 11 is a flowchart illustrating, in one embodiment of the present invention, the steps involved at the home node in servicing a received memory access request.
Figure 12:
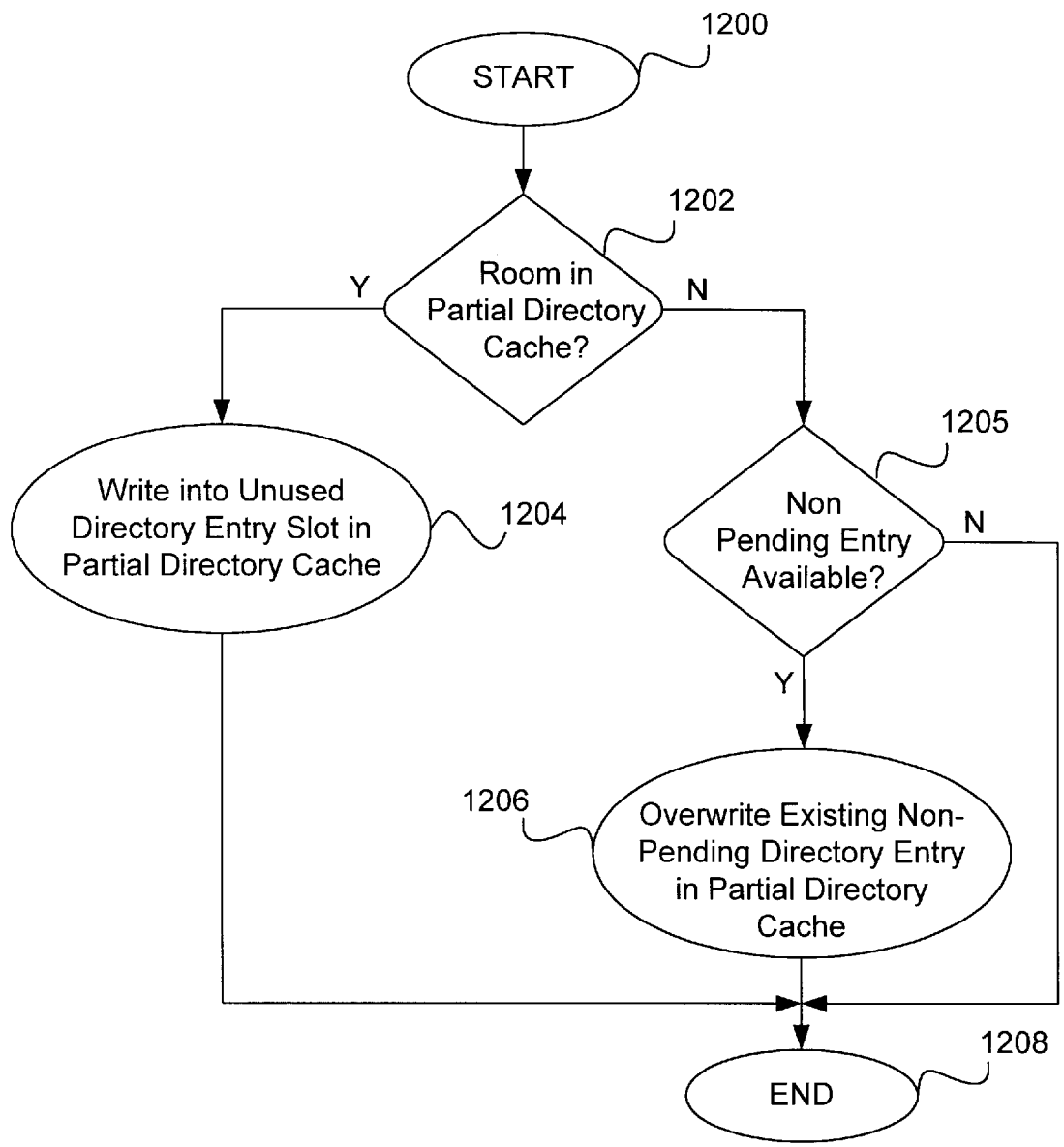
FIG. 12 is a flowchart illustrating, in one embodiment of the present invention, the steps involved at the home node in caching a directory entry into the partial directory cache when a renewal point is detected.

The advantages of the hybrid protocol may be more fully understood with reference to FIG. 11 and FIG. 12. FIG. 11 is a flowchart illustrating, in one embodiment of the present invention, the steps involved at the home node in servicing a received memory access request. In step 1102, a memory access request pertaining to a home memory block is received from the network infrastructure. In step 1104, the method determines whether a directory entry corresponding to the requested memory block exists in the partial directory cache, e.g., partial directory cache 950 of FIG. 10. If a directory entry corresponding to the requested memory block already exists in the partial directory cache of the home node, the method advantageously employs the directory protocol to service the received memory access request (step 1106). The transition from a directory-less protocol to a directory protocol occurs when there is a partial directory cache hit in partial directory cache 950.

On the other hand, if a directory entry corresponding to the requested memory block cannot be found in the partial directory cache at the home node, the method advantageously employs the directory-less protocol in servicing the received memory access request. In this manner, the hybrid protocol advantageously avoids having to poll the network nodes to ascertain the directory states of a memory block when there is a partial directory cache miss. The transition from a directory protocol to a directory-less protocol occurs when there is a partial directory cache miss in partial directory cache 950.

In step 1110, the recently serviced memory access request is examined to determine whether it represents a transaction that may create a renewal point in the directory states of the requested memory block. As mentioned earlier, one such renewal point is created when the recently serviced memory access request is an RTO (read-to-own) request.

If the recently serviced memory access request furnishes a renewal point, the method proceeds to step 1112 wherein the directory states related to the recently requested memory block is cached into a directory entry in partial directory cache 950. If not, the steps of servicing a memory access request using the hybrid protocol ends at step 1104.

In accordance with one aspect of the present invention, directory entries cached into partial directory cache 950 may be retained in partial directory cache 950 for as long as possible. At some point in time, however, partial directory cache 950 may become full. When an additional directory entry needs to be cached into partial directory cache 950, it may become necessary to make room in partial directory cache 950 in order to accommodate the newly cached directory entry.

In accordance with one aspect of the present invention, the invention simply discards directory entries which are not pending from partial directory cache 950 to make room for additional cached directory entries. A directory entry is nonpending when it is ascertained that its pending flag is not set. The discarding operation may be as simple as overwriting the directory entry slot containing the nonpending directory entry.

It is possible to simply discard a nonpending directory entry from partial directory cache 950 in the hybrid protocol because if a subsequent memory access request pertaining to the memory block whose directory entry has been previously discarded is received, the hybrid technique simply services this memory access request using the directory-less protocol.

FIG. 12 is a flowchart illustrating in greater detail the steps involved at the home node in caching a directory entry into the partial directory cache when a renewal point is detected. In step 1202, it is ascertained whether there is additional room in the partial directory cache to cache the new directory entry. If there is, the directory entry is merely written into an unused directory entry slot in partial directory cache 950 (step 1204). If there is no room in partial directory cache 950, the method ascertains whether a nonpending entry is available in partial directory cache 950 (step 905). If all current entries in partial directory cache 950 are pending, partial directory entry cache 950 may queue the directory entry to be cached next and cache it when an entry in partial directory entry cache 950 becomes non-pending. Alternatively, partial directory entry cache 950 may ignore the directory entry to be cached next and not cache it at all.

If there is a non-pending entry in partial directory entry cache 950, the non-pending entry may be discarded. The selection of a non-pending directory entry to discard when there are multiple directory entries not pending may be performed using any known technique. In one embodiment, as mentioned, the non-pending directory entry may simply be written over with the new directory entry in partial directory 950 (step 1206).

While this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a computer network having a first plurality of nodes coupled to a common network infrastructure and a distributed shared memory distributed among said first plurality of nodes, said computer network having no natural ordering mechanism and natural broadcast for servicing memory access requests by said plurality of nodes, a method for permitting a first node of said computer network to access a copy of a memory block of a memory module that has a home node different from said first node in said computer network, said home node having a partial directory cache that has fewer directory cache entries than a total number of memory blocks in said memory module, said method comprising:

receiving via said common network infrastructure at said home node from said first node a first memory access request for said memory block;

if directory states representing states of copies of said memory block on said first plurality of nodes are cached in a directory cache entry of said partial directory cache, servicing said first memory access request using a directory protocol by consulting said directory cache entry to determine which node in said computer network currently possesses a first valid copy of said memory block, said first valid copy of said memory block representing a valid copy of said memory block that is capable of servicing said first memory access request; and if said directory states related to said memory block are not cached in said partial directory cache, servicing said first memory access request using a directory-less protocol wherein said partial directory cache is not consulted, said directory-less protocol including the step of sending a request to a second plurality of nodes in said computer network for a second node in said computer network to send said first valid copy of said memory block to said first node, said second plurality of nodes representing said first plurality of nodes excepting said first node and said home node.

2. The method of claim 1 wherein said directory states related to said memory block are cached into said partial directory cache if said first memory access request generates a renewal point with respect to said directory states.

3. The method of claim 2 wherein said first memory access request is a request for an exclusive copy of said memory block by said first node.

4. The method of claim 2 further comprising the steps of: marking a status of said memory block as pending, upon receiving said first memory access request at said home node, to signify that an access for said memory block is in progress, said status while pending renders said home node incapable of servicing other memory access requests pertaining to said memory block;

upon receiving an acknowledgment from said first node acknowledging that said first memory access request has been fulfilled, marking said status of memory block as non-pending to signify that no access request pertaining to said memory block is in progress, thereby allowing said other memory access requests pertaining to said memory block to be serviced.

5. The method of claim 4 further comprising the step of ascertaining, prior to caching said directory states related to said memory block, whether there is room in said partial directory cache for caching said directory states related to said memory block.

6. The method of claim 5 further comprising the step of overwriting a non-pending, existing directory cache entry in said partial directory cache with said directory states related to said memory block if there is no room in said partial directory cache for caching said directory states related to said memory block.

7. The method of claim 5 wherein said directory states related to said memory block are not cached if there is no room in said partial directory cache for caching said directory states related to said memory block.

8. The method of claim 5 wherein said directory states related to said memory block are queued at said home node if there is no room in said partial directory cache for caching said directory states related to said memory block, said directory states related to said memory block are then cached in said partial directory cache by overwriting an existing directory cache entry in said partial directory cache when said existing directory cache entry becomes non-pending.

9. In a computer network having a first plurality of nodes coupled to a common network infrastructure and a distributed shared memory distributed among said first plurality of nodes, said computer network having no natural ordering mechanism and natural broadcast for servicing memory access requests by said plurality of nodes, a method for permitting a first node of said computer network to access a copy of a memory block of a memory module that has a home node different from said first node in said computer network, said home node having a partial directory cache that has fewer directory cache entries than a total number of memory blocks in said memory module, said method comprising:

receiving via said common network infrastructure at said home node from said first node a first memory access request for said memory block;

if directory states representing states of copies of said memory block on said first plurality of nodes are cached in a directory cache entry of said partial directory cache, servicing said first memory access request using a directory protocol by consulting said directory cache entry to determine which node in said computer network currently possesses a first valid copy of said memory block, said first valid copy of said memory block representing a valid copy of said memory block that is capable of servicing said first memory access request; and if said directory states related to said memory block are not cached in said partial directory cache, servicing said first memory access request using a directory-less protocol wherein said partial directory cache is not consulted, upon determining that said directory states related to said memory block are not cached in said partial directory cache, in servicing said first memory access request, wherein said directory-less protocol comprises the step of sending, if said home node does not have said first valid copy of said memory block, a request from said home node to a second plurality of nodes in said computer network to request a second node in said computer network to send said first valid copy of said memory block to said first node, said second plurality of nodes representing said first plurality of nodes excepting said first node and said home node.

10. The method of claim 9 further comprising the step of downgrading, upon said second node sending said first valid copy of said memory block from a memory cache of said second node to said first node, said first valid copy of said memory block at said second node from a copy of a first type to a copy of a second type different from said first type.

11. The method of claim 9 wherein said directory-less protocol further comprises the step of sending said first valid copy of said memory block from said home node to said first node if said home node possesses said first valid copy of said memory block.

12. A network node for coupling in a computer network having a first plurality of nodes coupled to a common network infrastructure and a distributed shared memory distributed among said first plurality of nodes, said computer network having no natural ordering mechanism and natural broadcast for servicing memory access requests by said plurality of nodes, said network node permitting a first node of said computer network different from said network node to access a copy of a memory block of a memory module that has a home on said network node, said network node comprising:

a partial directory cache having fewer directory cache entries than a total number of memory blocks in said memory module;

means for receiving from said common network infrastructure, when said network node is coupled in said computer network, at said network node from said first node a first memory access request for said memory block;

if directory states representing states of copies of said memory block on said first plurality of nodes are cached in a directory cache entry of said partial directory cache, directory means for servicing said first memory access request using a directory protocol by consulting said directory cache entry to determine which node in said computer network currently possesses a first valid copy of said memory block, said first valid copy of said memory block representing a valid copy of said memory block that is capable of servicing said first memory access request; and if said directory states related to said memory block are not cached in said partial directory cache, directory-less means for servicing said first memory access request using a directory-less protocol wherein said partial directory cache is not consulted, said directory-less means including means for sending a request to a second plurality of nodes in said computer network for a second node in said computer network to send said first valid copy of said memory block to said first node said second plurality of nodes representing said first plurality of nodes excepting said first node and said network node.

13. The network node of claim 12 further comprising means for caching said directory states related to said memory block into said partial directory cache if said first memory access request generates a renewal point with respect to said directory states.

14. The network node of claim 13 wherein said first memory access request is a request for an exclusive copy of said memory block by said first node.

15. The network node of claim 13 further comprising:

means for marking a status of said memory block as pending, upon receiving said first memory access request at said network node, to signify that an access for said memory block is in progress, said status while pending renders said network node incapable of servicing other memory access requests pertaining to said memory block; and upon receiving an acknowledgment from said first node acknowledging that said first memory access request has been fulfilled, means for marking said status of memory block as non-pending to signify that no access request pertaining to said memory block is in progress, thereby allowing said other memory access requests pertaining to said memory block to be serviced.

16. The network node of claim 13 wherein said directory states related to said memory block are cached in said partial directory cache by overwriting a non-pending, existing directory cache entry in said partial directory cache with said directory states related to said memory block if there is no room in said partial directory cache for caching said directory states related to said memory block.

17. The network node of claim 12 wherein said directory states related to said memory block are not cached into said partial directory cache if there is no room in said partial directory cache for caching said directory states related to said memory block even if said first memory access request generates a renewal point with respect to said directory states.

18. The network node of claim 12 further comprising a queue for queuing at said network node said directory states related to said memory block if said first memory access request generates a renewal point with respect to said directory states and there is no room in said partial directory cache for caching said directory states related to said memory block, said directory states related to said memory block are then cached in said partial directory cache from said queue by overwriting an existing directory cache entry in said partial directory cache when said existing directory cache entry becomes non-pending.

19. The network node of claim 12 wherein said request from said directory-less is sent from said network node to said second plurality of nodes.

20. The network node of claim 19 further comprising means for sending said first valid copy of said memory block from said network node to said first node if said network node possesses said first valid copy of said memory block and said first memory access request is serviced using said directory-less protocol.

21. In a computer network having a first plurality of nodes coupled to a common network infrastructure and a distributed shared memory distributed among said first plurality of nodes, a method for servicing a memory access request by a first node of said computer network pertaining to a memory block of a memory module that has a home node different from said first node in said computer network, said home node having a partial directory cache that has fewer directory cache entries than a total number of memory blocks in said memory module, said method comprising:

receiving via said common network infrastructure at said home node from said first node said first memory access request for said memory block;

ascertaining whether said memory block is currently cached in said partial directory cache;

if said memory block is currently cached in said partial directory cache, servicing said first memory access request using a directory protocol by consulting said partial directory cache to determine which node in said computer network currently possesses a first valid copy of said memory block, said first valid copy of said memory block representing a valid copy of said memory block that is capable of servicing said first memory access request; and if said memory block is not currently cached in said partial directory cache, servicing said first memory access request using a directory-less protocol wherein said partial directory cache is not consulted, said directory-less protocol including the step of sending a request to a second plurality of nodes in said computer network for a second node in said computer network to send said first valid copy of said memory block to said first node, said second plurality of nodes representing said first plurality of nodes excepting said first node and said home node.

22. The method of claim 21 wherein directory states related to copies of said memory block in said first plurality of nodes are cached into said partial directory cache if said first memory access request generates a renewal point with respect to said directory states.

23. The method of claim 22 wherein said first memory access request is a request for an exclusive copy of said memory block by said first node.

* * * * *